Figure 1:
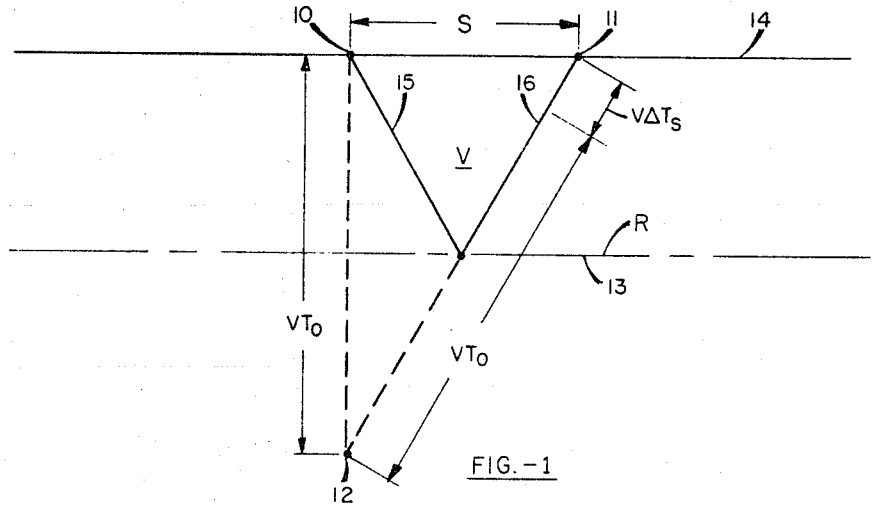

Oct. 11, 1966

R. L. SANDERS 3,278,894

SEISMIC NORMAL MOVE-OUT CORRECTION

Filed Nov. 8, 1963

2 Sheets-Sheet 1

RAYMOND L. SANDERS
INVENTOR.

BY *Newell Pottoff*

ATTORNEY.

United States Patent Office 3,278,894
Patented Oct. 11, 1966

3,278,894
SEISMIC NORMAL MOVE-OUT CORRECTION
Raymond L. Sanders, Houston, Tex., assignor to Pan American Petroleum Corporation, Tulsa, Okla., a corporation of Delaware
Filed Nov. 8, 1963, Ser. No. 322,436
3 Claims. (Cl. 340—15.5)

This invention relates to seismic geophysical surveying and is directed particularly to the correction of seismic data for normal move-out.

The interpretation and display of seismic data, obtained by recording the energy received on a spread of seismometers from a remote source of artificial seismic waves, after reflection from subsurface interfaces, require making certain corrections to the different traces before they can properly be compared or combined. That is, time shifting of one trace relative to another by a fixed amount may be required due to changing or different elevations of the sources, of the particular receivers, or both, or due to changes in the thickness or velocity of the low-velocity layer traversed by the energy traveling the different paths under consideration.

An additional correction varying with record time is also required to account for the horizontal offsetting of surface seismometers from the point of generation of the seismic waves. This is generally termed the normal move-out or angularity-of-path correction, and it is to making this latter correction that the present invention is directed. Regardless of the horizontal offset of any seismometer from the point of origin of the seismic waves, it is generally desired to correct the resultant trace to correspond to the reflection travel times that would have been observed had the seismometer been placed at or above the point of origin of the seismic waves.

While a great many systems have been devised for performing this correction, most of them are either quite mechanically complex or provide only an approximate correction rather than a true and accurate one. One approximate formula which is frequently used amounts to choosing the first term of an infinite series and neglecting higher-order terms, which are generally small except under certain conditions. When these conditions occur, however, as when the travel time is small, the seismometer offset distance is large, or the average seismic-wave velocity is unusually small, then this approximation becomes undesirably inaccurate.

In view of this, it is a primary object of my invention to avoid the inaccuracy of move-out determination by an approximation system in a comparatively simple and non-complicating manner. More specifically, it is an object of my invention to provide a normal move-out correction system which is completely accurate for all real values of move-out, vertical travel time, horizontal offset distance, and average velocity, insofar as the wave travel can be considered to be along straight-line ray paths. A still further object is to provide a normal move-out correction system which possesses all of the flexibility and ease of adjustment inherent in present approximation systems. Other and further objects, uses, and advantages of the invention will become apparent as the description proceeds.

Briefly stated, the foregoing and other objects are accomplished in my invention by utilizing the geometrical relationships involved in determining normal move-out in a slightly different form from that involving the series-expansion approximation. Whereas the approximation method obtains the normal move-out correction as an explicit solution of an approximate equation, my system is an electromechanical analog in which the normal move-out is not expressly obtained as a separate voltage for use in a servo self-balancing system, but rather is present also as a self-correcting term in the analog expression of the exact equation. In other words, my system is a servo-or self-balancing system in which all terms of an exact equation for the normal move-out are precisely simulated.

Figure 2:
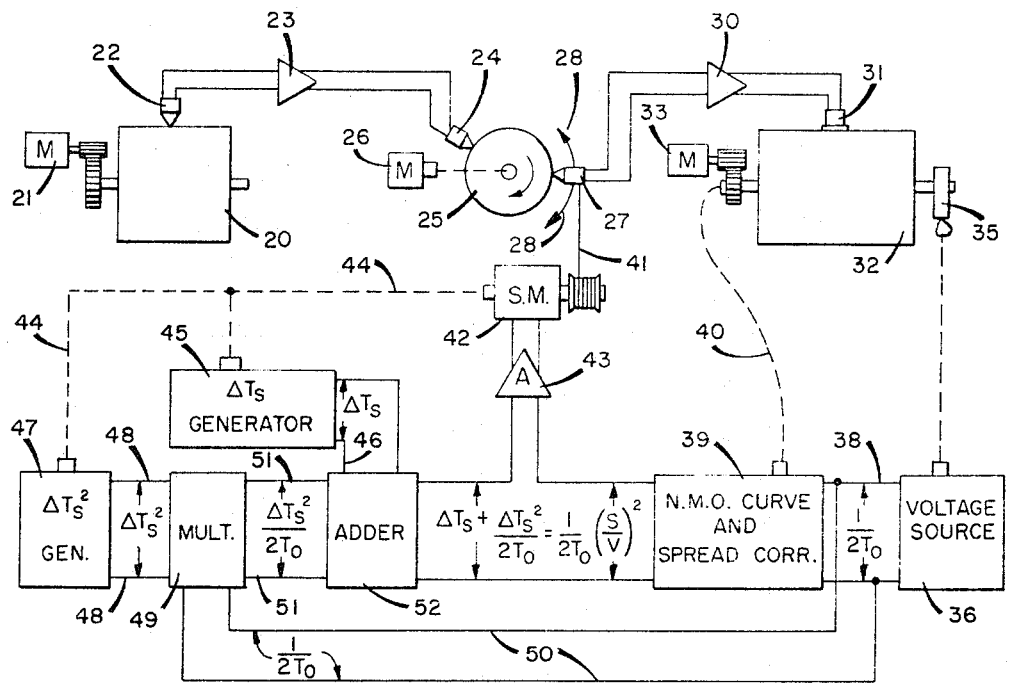
Figure 3:
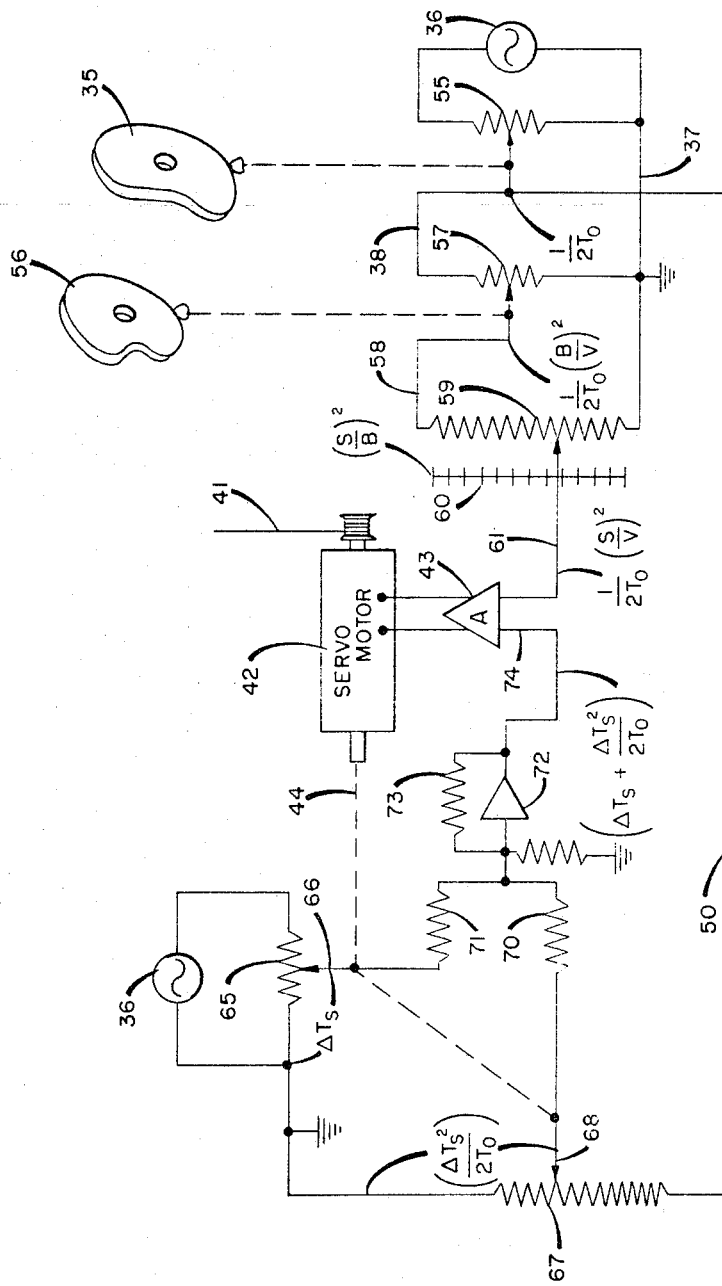

This will be better understood by reference to the accompanying drawings forming a part of this application. In these drawings, FIGURE 1 shows the geometrical problem involved in stating and solving the move-out equation;

FIGURE 2 shows a system of move-out correction embodying my invention in block-diagram form; and FIGURE 3 shows a diagrammatic wiring diagram of one embodiment of the invention corresponding to the functional diagram of FIGURE 2.

Referring now to these drawings in detail and particularly to FIGURE 1 thereof, this figure shows the geometrical problem involved in the removal of normal move-out from a seismic trace. Thus, S represents the horizontal distance between a shotpoint 10 and a seismometer 11 at the ground surface 14, while the ray paths 15 and 16 represents the assumed straight-line travel path of reflection energy from the shotpoint 10 to a reflecting interface 13 and thence to the seismometer 11. As is common in seismometry, the virtual position 12 of shotpoint 10, from which the reflection appears to arrive at the seismometer 11, is simply the mirror image of the shotpoint 10 in the reflecting interface 13. $T_0$ is the travel time vertically from the image point 12 to the surface 14, whereas the actual travel time between the point 12 and the seismometer 11 is greater than this by the amount $\Delta T_s$. Assuming V as the average velocity of seismic wave travel between surface 14 and reflector 13, $VT_0$ represents vertical travel distance, whereas the actual slant travel distance is greater by the amount $V\Delta T_s$. The latter is simply the extra distance of travel due to the offset S between shotpoint 10 and seismometer 11, and so the time $\Delta T_s$ involved in this extra travel distance is the move-out time which is to be corrected or removed.

As the triangle connecting points 10, 11 and 12 is a right triangle, its sides are related by the simple equation $$(VT_0)^2 + S^2 = (VT_0 + V\Delta T_s)^2 \tag{1}$$

Dividing this equation by $V^2$ converts to the equation of times $$T_0^2 + \left(\frac{S}{V}\right)^2 = (T_0 + \Delta T_s)^2 \tag{2}$$

This latter equation can be solved explicity for $\Delta T_s$ obtaining $$\Delta T_s = \left[T_0^2 + \left(\frac{S}{V}\right)^2\right]^{1/2} - T_0 \tag{3}$$

As it is somewhat inconvenient to use this expression for move-out time because of the radical, an approximation is commonly used based on the expansion of the radical into an infinite series giving $$\Delta T_s = T_0 + \frac{1}{2T_0}\left(\frac{S}{V}\right)^2 - \frac{1}{8T_0^3}\left(\frac{S}{V}\right)^4 + \ldots - T_0$$

Here $T_0$ drops out, and when S is small relative to $T_0$ and V, the series terms after the first are relatively small, so that the approximation $$\Delta T_s \cong \frac{1}{2T_0}\left(\frac{S}{V}\right)^2 \tag{4}$$

is frequently considered satisfactory.

It is sometimes true, however, that S is too large, or $T_0$ or V, relatively speaking, are too small for satisfactory move-out correction. In fact, the difference between the approximate and the accurate correction can sometimes become so large as to adversely affect the utilization or interpretation of data for shallow reflections and/or for large seismometer offsets.

My invention is based on development of a complete analog of the above equation of time:

$$T_o^2 \left(\frac{S}{V}\right)^2 = (T_0 + \Delta T_s)^2 \qquad (2)$$

Expanding the right hand side of this equation gives $$T_o^2 + \left(\frac{S}{V}\right)^2 = T_o^2 + 2T_o \Delta T_s + \Delta T_s^2$$

Dividing both sides by $2T_o$ and dropping out the $T_o$ terms gives $$\Delta T_s + \frac{\Delta T_s^2}{2T_o} = \frac{1}{2T_o}\left(\frac{S}{V}\right)^2 \qquad (5)$$

which is an exact expression of the relationship of move-out time $\Delta T_s$, S, V, and $T_o$.

Although the precision of move-out correction utilizing this expression is limited by the basic assumption of wave travel along straight-line ray paths, whereas in fact travel along somewhat curved ray paths is what takes place, nevertheless the effect of path curvature is generally smaller than the correction involved here. Besides, curved-ray move-out correction is a much more complex procedure, that is sometimes impossible for lack of sufficiently detailed subsurface velocity data. Accordingly, move-out correction by the present invention, though admittedly incomplete, is a substantial improvement over the approximation of Equation 4.

FIGURE 2 shows in block-diagram form a playback system which embodies this exact equation in analog form. While it will be described in connection with a magnetic playback and display system, it is to be understood that this is only by way of example and that the principles of the invention can be applied in playback systems of other than the magnetic type. Thus, each trace of a magnetic-tape field seismic recording on a playback drum 20, rotated by a motor 21, is picked up in sequence by a reproducing head 22 connected to an amplifier 23 and fed to an intermediate recording head 24 adjacent a magnetic disc or drum 25 rotated at constant speed by a motor 26. The signal recorded by head 24 on disc or drum 25 is picked up by a reproducing head 27 movable about the periphery of drum or disc 25 as indicated by arrows 28, so that heads 24 and 27, together with disc 25, constitute a magnetic variable delay line such that the time delay between the recording and reproduction, respectively, by heads 24 and 27, can be changed at will by movement of the head 27. The output of reproducer 27, amplified by an amplifier 30, feeds a recording element 31 for producing a display trace or the like on a cross-section or plotting drum 32 rotated by a motor 33 in synchronism with the rotation of playback drum 20. It is by appropriate movement of the reproducing head 27 during the playback of any single trace from the drum 20 to the display drum 32 that the correction of that trace for move-out is accomplished.

By a cam 35 or the like, rotating with plotting drum 32, the voltage from a voltage source 36 is varied in accordance with the vertical travel time $T_o$ to produce an output voltage from source 36 corresponding to the quantity $1/2T_o$. This voltage, appearing on output leads 37, 38, is transmitted to a normal move-out curve and spread-correction circuit 39 where it is modified by the multiplying factor $(S/V)^2$. A mechanical driving connection 40 between plotting drum 32 and circuit 39 accounts for the variation in value of V with time $T_o$. As will be apparent, this part of the system produces a voltage representing the right hand side of the above Equation 5. Also, this voltage represents the approximate value of the move-out correction itself according to Equation 4 above. It thus represents approximately the manner in which the movable head 27 must be shifted around the periphery of delay line drum 25.

This movement of the head 27 is accomplished by a mechanical connection 41 to the output shaft of a servo-motor 42 to which the voltage output of circuit 39 is applied through an amplifier 43. Since it is desired to operate this system as a self-balancing system, the rotation of servo-motor 42 is also applied, by a mechanical connection 44, to a voltage source 45 to produce at the output thereof on leads 46 a voltage representing the normal move-out correction $\Delta T_s$, with the same voltage-to-time scale or ratio as the output of circuit 39. The mechanical linkage 44 also extends to a second voltage generator 47, which produces a voltage varying as the square of the value of the normal move-out $\Delta T_s$, in the same voltage units as generator 45, so that a voltage appears on output lead 48 corresponding to $\Delta T_s^2$. This is applied to the input terminals of a multiplying circuit 49, to which the voltage corresponding to the quantity $1/2T_o$ is also applied as an input by leads 50 from the voltage source 36. Thus, on the output leads 51 of multiplier 49 there appears a product voltage representing the equation term $\Delta T_s^2/2T_o$. By adding this in a circuit 52 to the $\Delta T_s$ voltage present on leads 46, the output voltage of the adder represents the left hand side of the above Equation 5. This output is connected to the amplifier 43 in opposition to the output of circuit 39, so that as a result the servo-motor 42 tends to keep the two input voltages balanced against each other by seeking to reduce and maintain their difference at zero. Its resultant motion, as transmitted by the mechanical connection 41 to the movable head 27 of the delay line, is the exact straight-ray normal move-out correction for all useful values of $T_o$, S, and V.

In FIGURE 3 are shown in somewhat further detail circuits embodying the normal move-out equation analog shown generally in FIGURE 2. Thus, the cam 35 may actuate the slider of a potentiometer 55 energized by a voltage source 36 to produce on the output lead 38 connected to the slider voltage corresponding to the quantity $1/2T_o$. As will be apparent, it is not necessary to use values of $T_o$ that are very small or zero because they do not represent real reflection travel times of practical interest or significance.

In determining the normal move-out curve, it is conventional to determine as accurately as possible the normal move-out for a seismometer offset at a large distance B which represents the likely maximum seismometer offset distance. The effect of variation of the average velocity V with depth or with vertical travel time $T_o$ is included in this determination. While there are many well-known ways of deriving a voltage varying as the quantity $(B/V)^2$, one way this may be done involves the proper shaping of a cam 56, rotated by the plotting drum 32 in synchronism with cam 35 and using it to vary the position of the slider on a potentiometer 57. By whatever means is chosen, an output voltage corresponding to the quantity $$\frac{1}{2T_o}\left(\frac{B}{V}\right)^2$$

is derived and applied to a lead 58.

In order to utilize this curve for a seismometer offset at any less distance S smaller than B, it is only necessary to modify the voltage on lead 58 by the factor $(S/B)^2$. Thus, by applying this voltage to a potentiometer 59, the slider of which is adjusted according to a scale 60 calibrated un units of $(S/B)^2$, the voltage appearing on the slider 61 of spread-correction potentiometer 59 for application to the amplifier 43 represents the quantity $$\frac{1}{2T_o}\left(\frac{S}{V}\right)^2$$

The left hand side of the exact normal move-out equation, derived through linkage 44 from the rotation of servo-motor 42, is provided by a linear potentiometer 65, energized by the source 36, along which the slider 66 moves to pick off a voltage numerically equal to the quantity $\Delta T_s$. Simultaneously, the slider 68 of a non-linear squaring potentiometer 67 is moved in accordance with the rotation of servo-motor 42, so that the resistance of potentiometer 67 between slider 68 and ground varies as the square of the normal move-out correction, or $\Delta T_s^2$. As potentiometer 67 is energized over the lead 50 with a voltage corresponding to the quantity $1/2T_o$, the resulting product voltage on slider 68 varies as the quantity $\Delta T_s^2/2T_o$. This voltage is applied to an adding resistor 70, while the voltage on slider 66 is applied to the adding resistor 71, both being connected to the input of an operational amplifier 72 provided with a feedback resistor 73 to produce unity gain. The output of this amplifier, representing the sum of the voltages $\Delta T_s$ and $\Delta T_s^2/2T_o$ is applied by the lead 74 to the amplifier 43 in opposition to the voltage on lead 61. Thus, the desired Equation 5 is exactly simulated by the self-balancing action of the servo-motor 42, and the simultaneous shifting of the head 27 compensates for the added travel time $\Delta T_s$.

While I have thus described my invention in terms of the foregoing details and specific embodiments, it is to be understood that these are by way of example only and that further details and modifications will be apparent to those skilled in the art. Specifically, the electrical voltage squaring, multiplication, and addition operations corresponding to the terms on the left hand side of the analog equation can be performed in a variety of ways besides those illustrated. Also, the motion of servo-motor 42 can be applied directly to reproducing head 22 rather than head 27, if desired. The scope of the invention, therefore, should not be considered as limited to these details, but rather is to be ascertained from the appended claims.

I claim:
1. In a system for correcting seismic normal move-out by reproducing a recorded seismic field trace and re-recording said trace while progressively varying the apparent travel time of seismic waves on said trace in the re-recording process, the combination which comprises means for reproducing said trace, means for re-recording said trace, a servo-motor for moving, relative to the other, at least one of said means for reproducing said trace and said means for re-recording said trace by an amount corresponding to $\Delta T_s$, the normal move-out of reflected seismic waves received by a seismometer at a horizontal distance S from a seismic wave source, means actuated by said servo-motor for producing a first electric voltage representing $\Delta T_s$, means actuated by said servo-motor for producing a second voltage representing

$$\frac{\Delta T_s^2}{2T_o}$$

where $T_o$ is the vertical travel time of seismic waves, means for producing an output voltage which is the sum of said first and second voltages, means for producing a third voltage representing $$\frac{1}{2T_o}\left(\frac{S}{V}\right)^2$$

where V is the average velocity of seismic-wave travel to the depth $VT_o$, and means for applying the difference between said sum voltage and said third voltage to drive said servo-motor in a self-balancing sense, whereby it varies said first and second voltages to reduce said difference substantially to zero and correspondingly moves said at least one means by said amount corresponding to $\Delta T_s$.

2. An analog system for utilizing the exact normal move-out equation $$\Delta T_s + \frac{\Delta T_s^2}{2T_o} = \frac{1}{2T_o}\left(\frac{S}{V}\right)^2$$

in which $\Delta T_s$ is the normal move-out of seismic waves received from a reflecting interface by a seismometer at a horizontal distance S from a seismic wave source, $T_o$ is the vertical seismic wave travel time along a path from said source to said reflecting interface and thence to said seismometer, and V is the average velocity of wave travel along said path, said analog system comprising a servo-motor, means driven by said servo-motor for introducing a variable apparent relative time delay between a means for reproducing the seismic trace produced by said seismometer and a means for re-recording said trace, a first voltage source variable by said servo-motor to produce a first voltage output representing $\Delta T_s$, a second voltage source variable by said servo-motor to produce a second voltage output representing $$\frac{\Delta T_s^2}{2T_o}$$

means connected to the output of said sources to sum said first and second output voltages, means for producing a third voltage representing $$\frac{1}{2T_o}\left(\frac{S}{V}\right)^2$$

and means for applying the differences between said sum and said third voltage to said servo-motor as an input in a self-balancing sense, whereby said servo-motor adjusts said first and second voltage outputs in the direction to reduce said difference to zero and thereby drives said delay means to compensate the seismic wave normal move-out.

3. A system for correcting normal move-out comprising means for reproducing a recorded seismic field trace in electrical form, means for re-recording said reproduced trace in visible form, and means for transmitting the output of said reproducing means to said re-recording means with variable time delay, said transmitting means comprising a servo-motor, delay-producing means actuated by said servo-motor to provide said delay, means actuated by said recording means to generate a first voltage proportional to $$\frac{1}{2T_o}\left(\frac{S}{V}\right)^2$$

where $T_o$ is the vertical travel time of reflected seismic waves in the earth, V is the average compressional seismic wave velocity through the earth to reflecting interfaces whose vertical depth is to be determined, and S is the horizontal offset distance from the point of seismic wave origin to the seismometer from which said trace is recorded, means actuated by said servo-motor to produce a second voltage proportional to $\Delta T_s$, the normal move-out time of reflected seismic waves at said seismometer offset distance, means actuated by said servo-motor to produce a third voltage proportional to $\Delta T_s^2$, means for producing a product voltage proportional to $$\frac{\Delta T_s^2}{2T_o}$$

and to sum said product voltage and said second voltage, and means to apply the difference between said sum voltage and said first voltage to said servo-motor in a sense to produce self balancing and corresponding adjustment of said variable time delay.

References Cited by the Examiner
UNITED STATES PATENTS

| 2,800,639 | 7/1957 | Lee | 340—15.5 |
|---|---|---|---|
| 3,134,958 | 5/1964 | Burns | 340—15.5 |
| 3,163,845 | 12/1964 | Kimbell | 340—15.5 |
| 3,163,846 | 12/1964 | Kimbell | 340—15.5 |

BENJAMIN A. BORCHELT, *Primary Examiner.*

R. M. SKOLNIK, *Assistant Examiner.*